Oct. 7, 1947.   L. KALMAN   2,428,627
FOCAL FIELD PERIPHERY INDICATING DEVICE IN PHOTOGRAPHIC APPARATUS
Filed April 21, 1945

INVENTOR:
LADISLAUS KALMAN
BY K. A. Mayr
ATTORNEY

Patented Oct. 7, 1947

2,428,627

UNITED STATES PATENT OFFICE 2,428,627

FOCAL FIELD PERIPHERY INDICATING DEVICE IN PHOTOGRAPHIC APPARATUS

Ladislaus Kalman, Zurich, Switzerland, assignor by direct and mesne assignments, of one-half to Alfred Oschwald, Zurich, Switzerland, and one-half to Alos Aktiengesellschaft, Zurich, Switzerland, a firm of Switzerland Application April 21, 1945, Serial No. 589,501
In Switzerland May 26, 1944

8 Claims. (Cl. 88—24)

The present invention relates to a focal field periphery indicating device in photographic apparatus.

With this kind of apparatus, particularly where reproduction apparatus is concerned, the size of the object to be reproduced, was hitherto determined by means of a focusing screen control or by permanent marks on the object table. However, the first mentioned method presented the inconvenience of taking up too much time, and could not be carried out in all types of apparatus, whereas the last mentioned permitted merely a step-wise variation of the reproducing ratio; moreover, with originals having wide margins which are not to be reproduced, said marks are covered by these margins.

According to the present invention, the drawbacks stated above are eliminated in that the focal field is indicated by multiple light marks projected onto the original copy table. The realization of this method is based on the optical principle, that all sizes of objects associated with one and the same size of image, are limited by light rays which intercross one another in the principal focus of the objective located on the object side of the latter.

Figure 1:
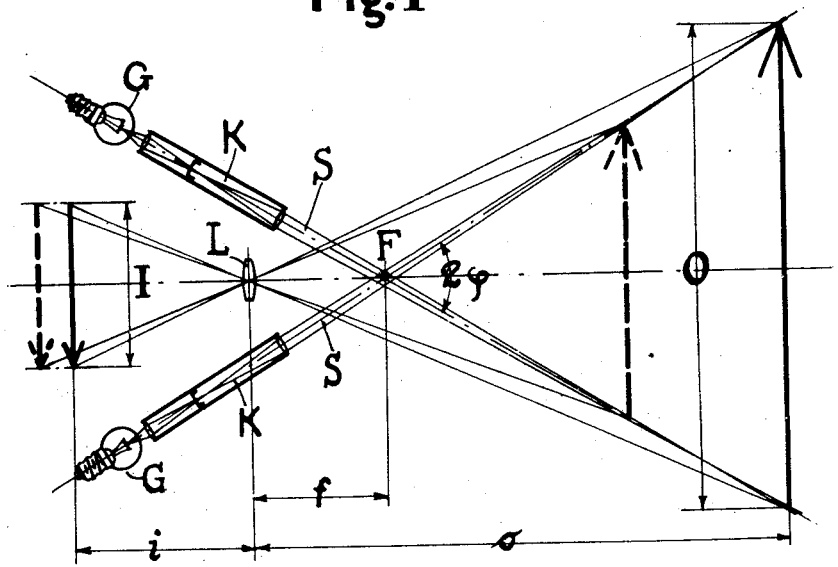

In Fig. 1 of the accompanying drawing, the objective of the camera is illustrated schematically as lens L. With this lens are associated two light sources in the form of incandescent lamps G, and in the ray beam of each lamp G, is located a collimator system K. Both systems are inclined one towards the other in such a manner, that the light or guiding rays S intercross one another at the point F which is the principal focus of the objective on the object side thereof.

According to a known optical relation of the reproduction ratio in the arrangement shown in Fig. 1, (1) $$\frac{O}{I} = \frac{o-f}{f}$$

wherein:

I = the size of the image,
O = the size of the object,
$i$ = the distance of the image from the middle plane of lens L,
$o$ = the distance of the object from the middle plane of lens L,
$f$ = the distance of the principal focus of lens L from the center thereof,
$2\varphi$ = the angles enclosed by the indicating rays;

(1) $$\frac{O}{I} = \frac{o-f}{f}$$

Furthermore, according to Fig. 1, (2) $$\tan \phi = \frac{O}{2(o-f)}$$

Where the value of O of Equation 1 is introduced in Equation 2, there results:

$$\tan \phi = \frac{I}{2f} \quad Q.\ E.\ D.$$

This value is constant when I is constant; this condition will generally be confirmed, particularly by reproducing methods, as I is in this case of a known value, given by the size of the negative form.

The aforesaid optical principle has been realized in the device according to the invention, by the fact that it comprises at least one light source and an associated device for producing directed light rays arranged in such a manner that the light rays intercross one another in the principal focus of the objective on the object side thereof and impinge in the form of light marks on certain points of the object to be reproduced which points determine the focal field perimeter.

The device according to the invention can be of such a design, that four guiding rays throw light upon the four corners of the copy to be reproduced.

Preferably the device is arranged in such a manner that the table carrying the object to be reproduced is coupled with the camera in such a manner that an automatic focusing is realized simultaneously with the adjustment of the image plane.

Figures 2, 3:
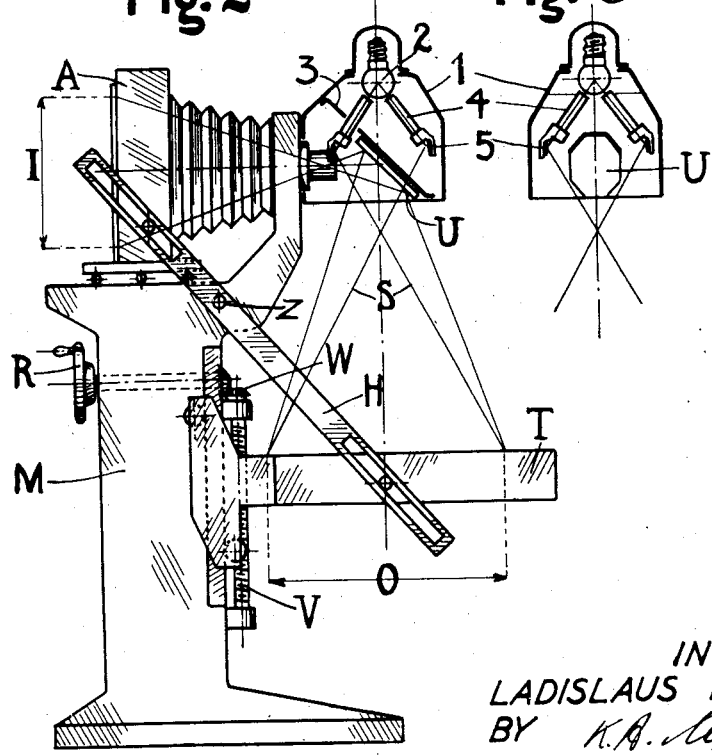

A constructional form of the object of the invention is illustrated schematically in the accompanying drawing in which:

Fig. 2 shows an elevation view with a partial section view of a vertical reproducing apparatus, and Fig. 3 the focal field periphery indicating device in a vertical section view.

In Fig. 2 of the drawing, the device is illustrated by way of an example, in the application to a vertical reproducing machine. M is the machine stand on which the copy table T is located which can be adjusted as to its elevation. The elevation of the table can be adjusted by means of a screw V, its rotary movement being produced by means of a bevel gear W, driven by a hand wheel R. On the stand is fixed the camera A, and in front of its objective is arranged a reflecting mirror U. The film supporting part of the camera A is coupled with the copy table T by means of a slide bar H journalled on a pivot Z fixed to the stand M, said slide bar effecting, when the copy table T is shifted automatically focusing.

The reflecting mirror U is located in a casing open below, and in the upper part of which is arranged an incandescent lamp 2 which is masked below by a partition 3, supporting the reflecting mirror. Below incandescent lamp 2 are arranged four collimator systems with lenses concentrating the light rays radiating from the incandescent lamp 2 in four narrow ray beams which are reflected by four small mirrors 5 in such a manner that they intercross in the principal focus of the objective on the object side thereof and impinge as guiding rays, in the four corners of the object O, on the copy table. In this manner four light marks are produced which serve to mark the four corners of the field in every elevation position of the copy table.

Instead of a single light source, there could also be provided multiple light sources.

I do not limit my invention to the structure shown and described as modifications, within the scope of the appended claims, may be made without departing from the spirit of my invention.

Having thus described my invention, what I claim as new and desire to secure by Letters Patent is:

1. In combination with a photographic camera having an objective and a film holder, an object support, a focal field periphery indicating device comprising a source of light connected with said objective, and light guide means connected with said source and guiding light from said source in a beam extending through the principal focus of said objective on the object side thereof to the periphery of the field of said camera on said support at any focused adjustment of the elements of said camera and producing a light mark on said periphery.

2. In a photographic apparatus, the combination of a photographic camera including an objective, a film holder, with a copy support, a focal field periphery indicating device indicating the area of copy included in the image on the film, said device comprising a light source connected with said objective, and collimator means connected with said source and having an optical axis extending through the principal focus of said objective on the object side thereof to the periphery of the field of said camera on said support at any focused adjustment or position of the elements of the camera and directing a beam of light to said support.

3. In combination with a photographic camera having an objective and a film holder, an object support, a focal field periphery indicating device comprising sources of light connected with said objective, and light guide means individually connected with said sources and having, individually, an optical axis extending through the principal focus of said objective on the object side thereof to the periphery of the field of said camera on said support at any focused adjustment of the elements of said camera and producing a light mark on said periphery.

4. In combination with a photographic camera having an objective and a film holder, an object support, a focal field periphery indicating device comprising a source of light rigidly connected with said objective, and a plurality of light guide means rigidly connected with said source, said guide means individually having an optical axis extending through the principal focus of said objective on the object side thereof and to the periphery of the field of said camera on said support at any focussed adjustment of the elements of said camera and directing light from said source in a plurality of rays to said periphery.

5. In combination with a photographic camera having an objective and a film holder, an object support, a reflecting mirror rigidly connected with said objective and interposed in the optical axis between said objective and the object to be photographed and positioned at an angle with said axis, a focal field periphery indicating device comprising a source of light rigidly connected with and positioned behind said mirror and masked thereby, and a plurality of light guide means rigidly connected with said mirror and having optical axes intersecting at the principal focus of said objective on the object side thereof and extending to the periphery of the field of said camera on said support at any focused adjustment of the elements of said camera and guiding light rays past said mirror and indicating points on said periphery.

6. In the combination with a photographic camera as defined in claim 5, said light guide means comprising individually a collimator system having a light deflecting mirror at the light exit end thereof.

7. A photographic reproducing apparatus comprising, in combination, a camera having an objective and a film holder, a support for the object to be photographed and movable substantially at a right angle with respect to the optical axis of said camera, a housing rigidly connected with said camera and having an opening for the light rays coming from said object and being open toward said objective, a reflecting mirror connected with and disposed in said housing at an angle of substantially 45° with respect to the optical axis of said camera, a source of light connected with and disposed in said housing, light guide means connected with and disposed in said housing and having an optical axis extending past said mirror through the principal focus of said objective on the object side thereof to the periphery of the field of said camera on said support at any focused adjustment of the elements of said camera and producing a light mark on said support indicating a point on said periphery.

8. A photographic reproducing apparatus comprising, in combination, a camera having an objective and a film holder, a support for the object to be photographed and movable substantially at a right angle with respect to the optical axis of said camera, a housing rigidly connected with said camera and having an opening for the light rays coming from said object and being open toward said objective, a reflecting mirror connected with and disposed in said housing at an angle of substantially 45° with respect to the optical axis of said camera, a source of light connected with and disposed in said housing behind said mirror and masked thereby, a plurality of light guide means connected with and disposed in said housing and comprising individually a collimator system having a light deflecting mirror at the light exit end and having an optical axis extending through the principal focus of said objective on the object side thereof and to the periphery of the field of said camera on said support at any focused adjustment of the elements of said camera and producing a light mark on said support indicating a point on said periphery.

LADISLAUS KALMAN.

REFERENCES CITED

The following references are of record in the file of this patent:

UNITED STATES PATENTS

| Number | Name | Date |
|---|---|---|
| 2,166,419 | O'Neill | July 18, 1939 |
| 1,765,277 | Kousminsky | June 17, 1930 |
| 1,404,440 | Jobke | Jan. 24, 1922 |
| 2,095,815 | Hopkins | Oct. 12, 1937 |